(No Model.) 13 Sheets—Sheet 1.
R. STEEGMÜLLER.
MACHINE FOR SOLDERING SIDE SEAMS OF CAN BODIES.
No. 591,896. Patented Oct. 19, 1897.
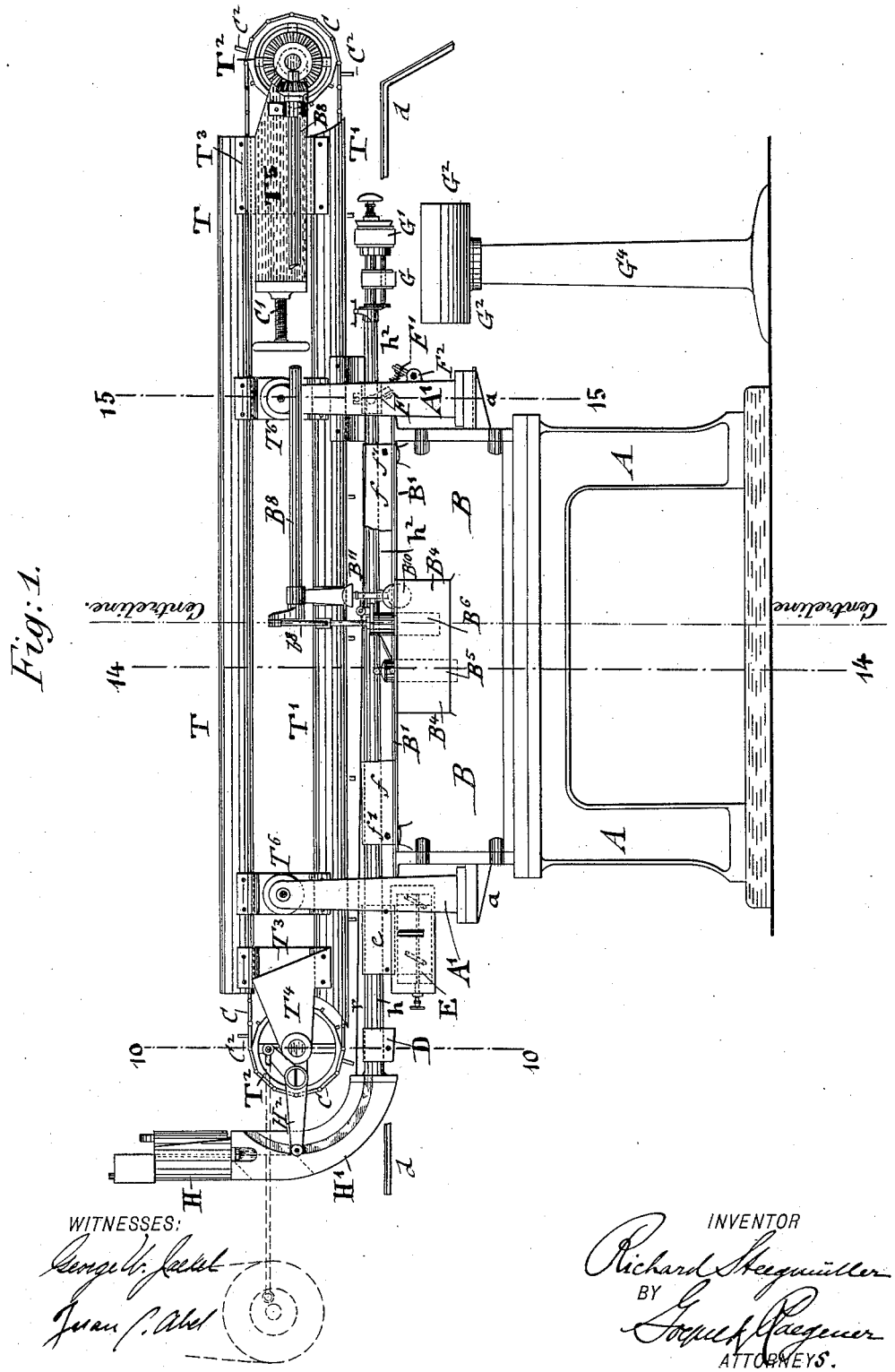

(No Model.) 13 Sheets—Sheet 2.
R. STEEGMÜLLER.
MACHINE FOR SOLDERING SIDE SEAMS OF CAN BODIES.
No. 591,896. Patented Oct. 19, 1897.
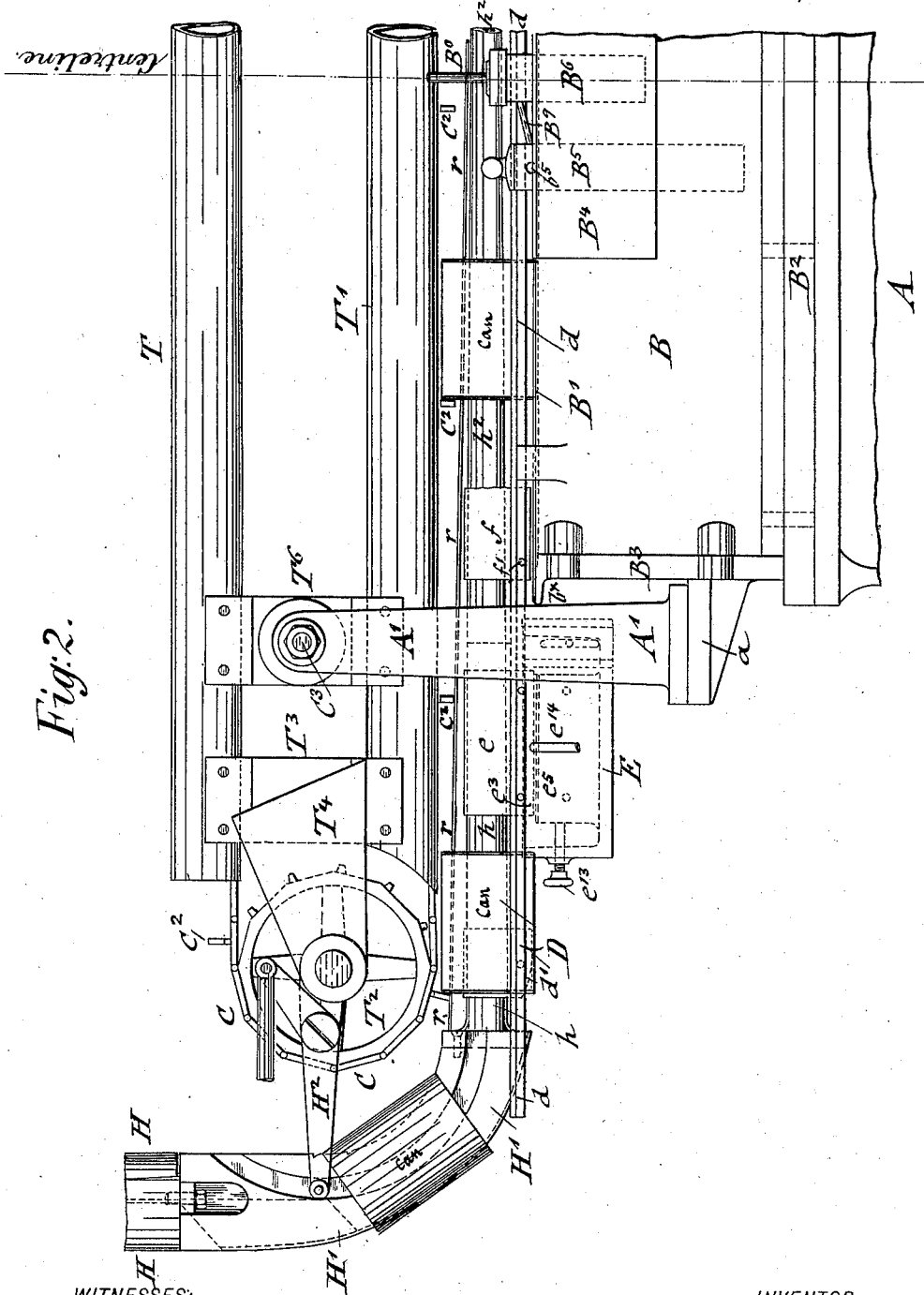

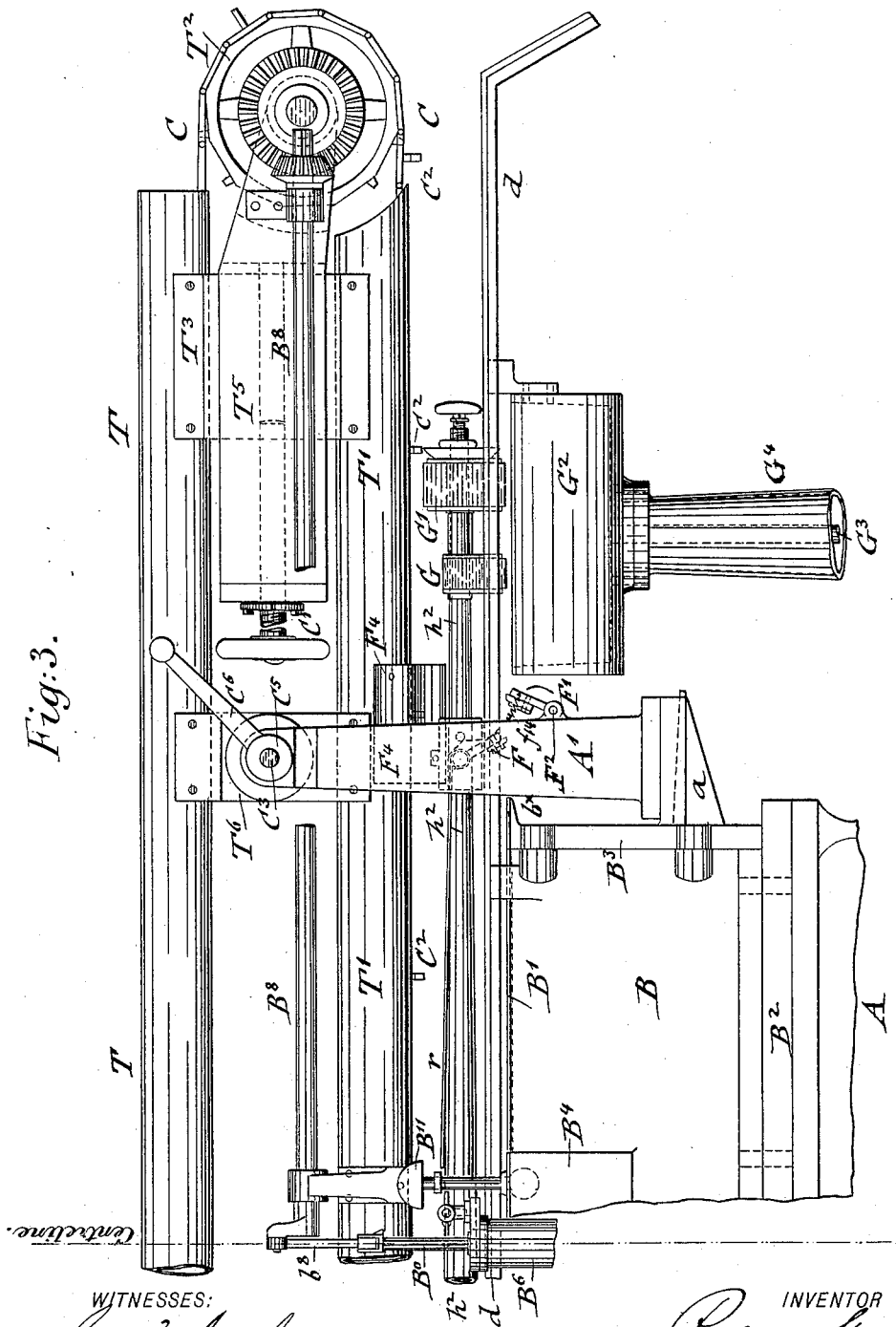

(No Model.)  13 Sheets—Sheet 4.
R. STEEGMÜLLER.
MACHINE FOR SOLDERING SIDE SEAMS OF CAN BODIES.
No. 591,896.  Patented Oct. 19, 1897.
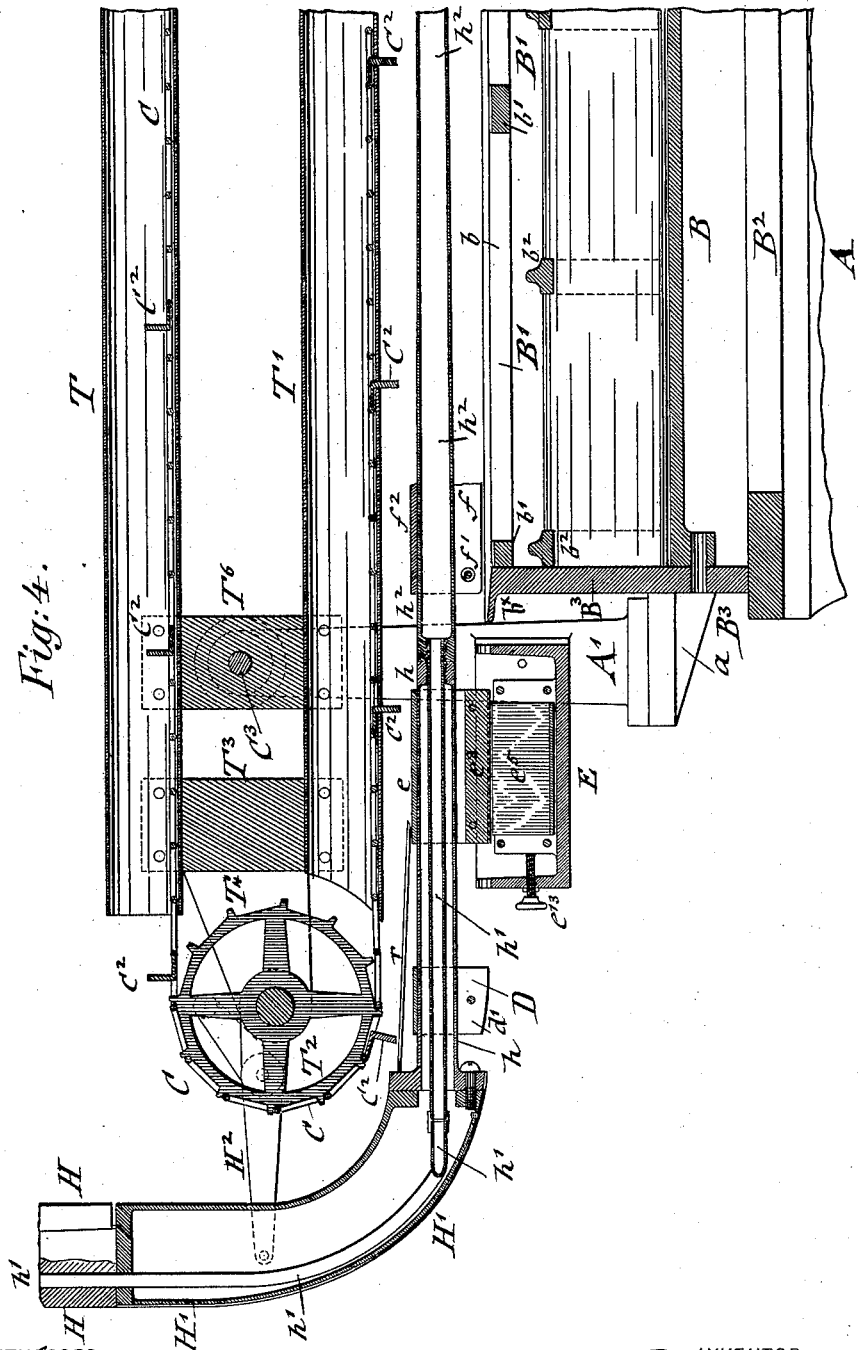
WITNESSES:
George W. Jackel.
Juan E. Abel
INVENTOR
Richard Steegmüller
BY
ATTORNEYS.

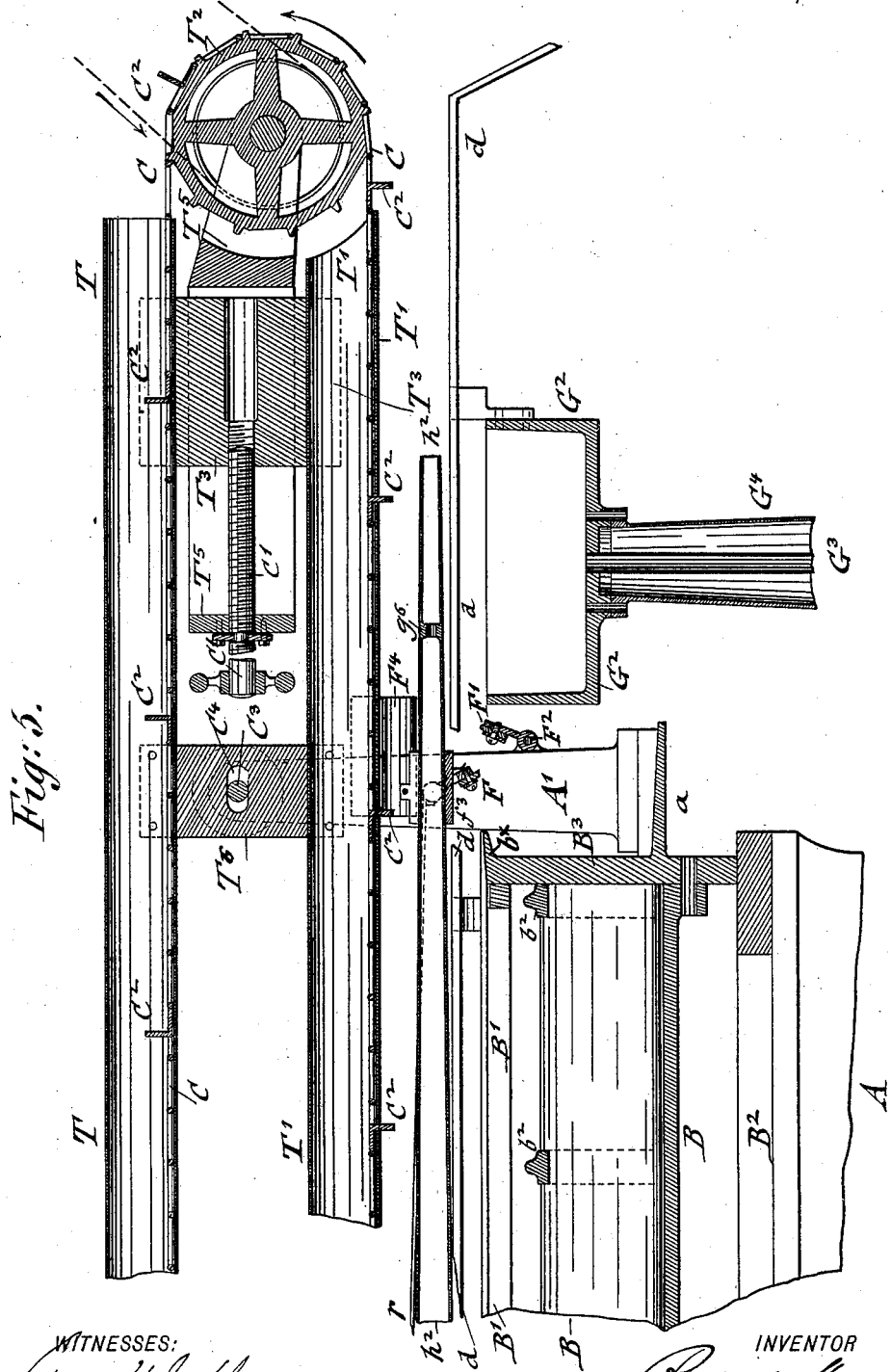

(No Model.) 13 Sheets—Sheet 6.
R. STEEGMÜLLER.
MACHINE FOR SOLDERING SIDE SEAMS OF CAN BODIES.
No. 591,896. Patented Oct. 19, 1897.
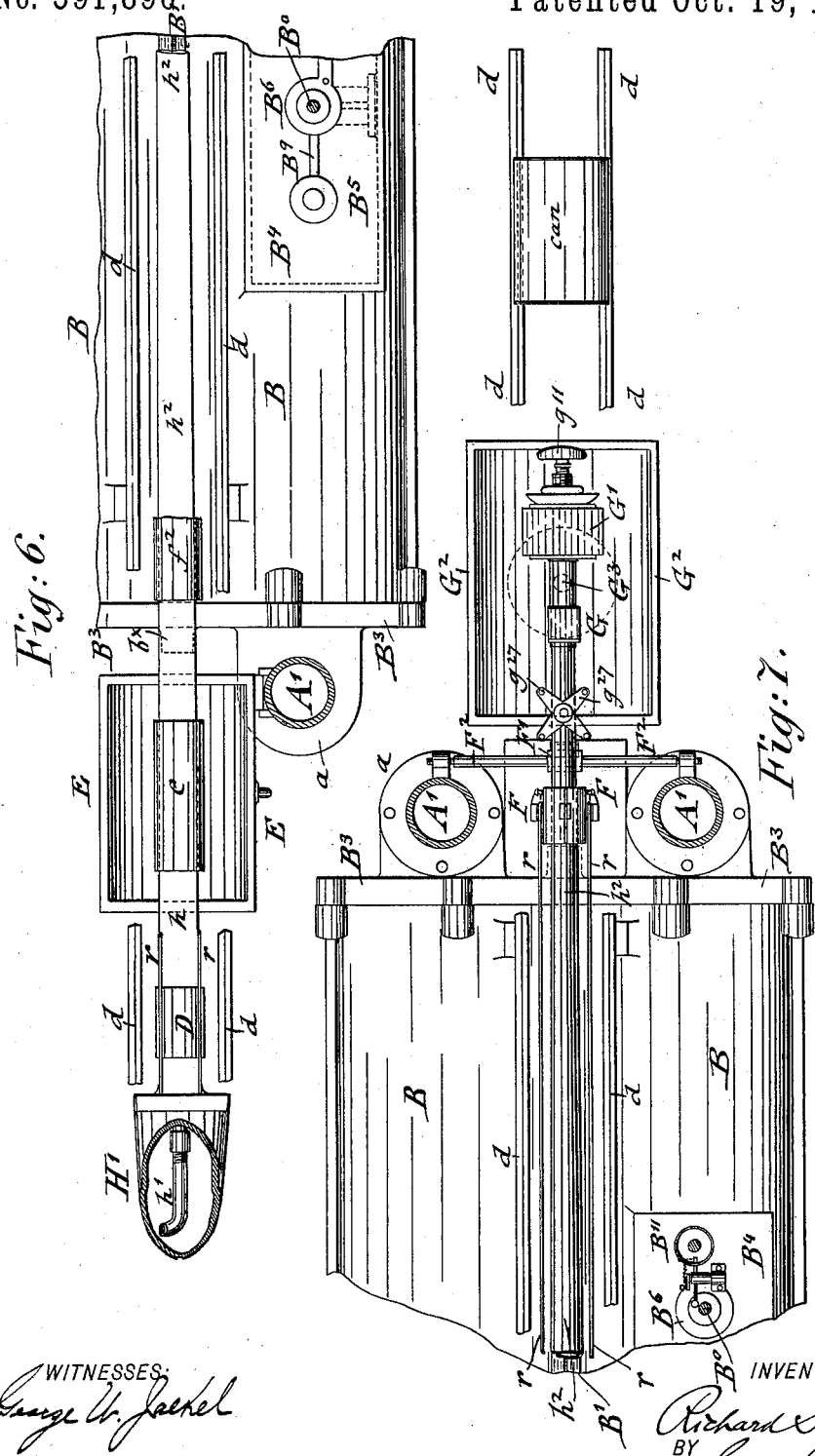

(No Model.) 13 Sheets—Sheet 7.
R. STEEGMÜLLER.
MACHINE FOR SOLDERING SIDE SEAMS OF CAN BODIES.
No. 591,896. Patented Oct. 19, 1897.
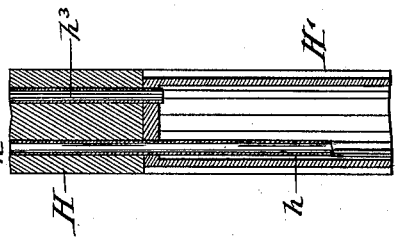
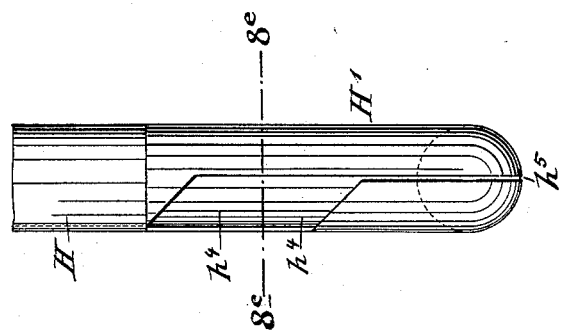
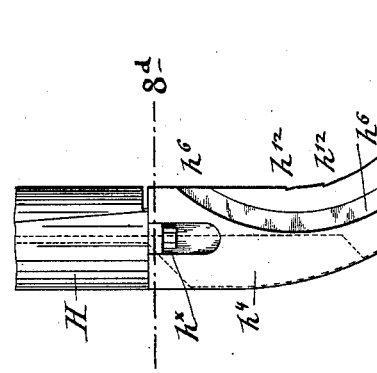
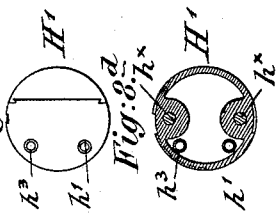

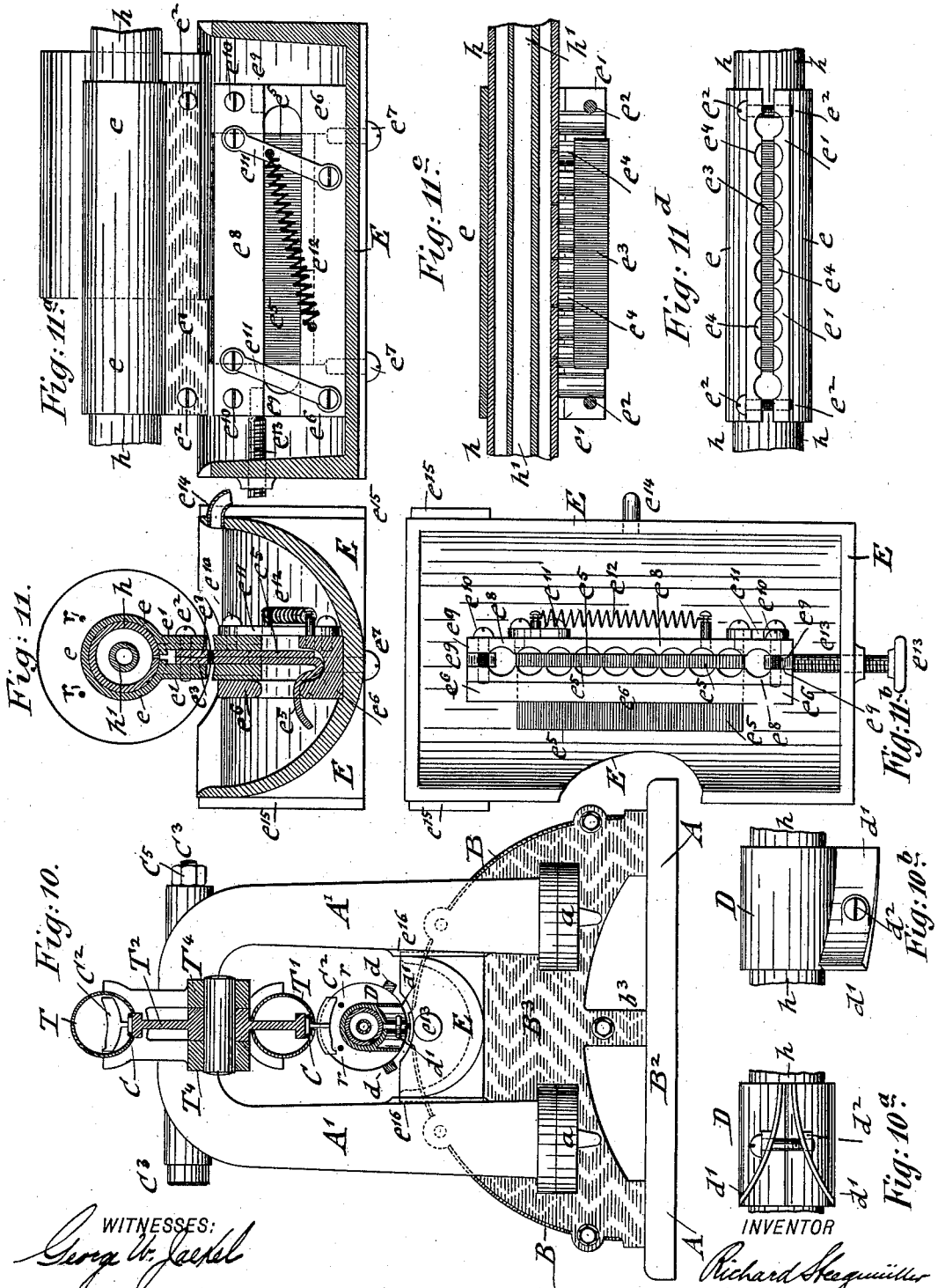

(No Model.) 13 Sheets—Sheet 9.
R. STEEGMÜLLER.
MACHINE FOR SOLDERING SIDE SEAMS OF CAN BODIES.
No. 591,896. Patented Oct. 19, 1897.
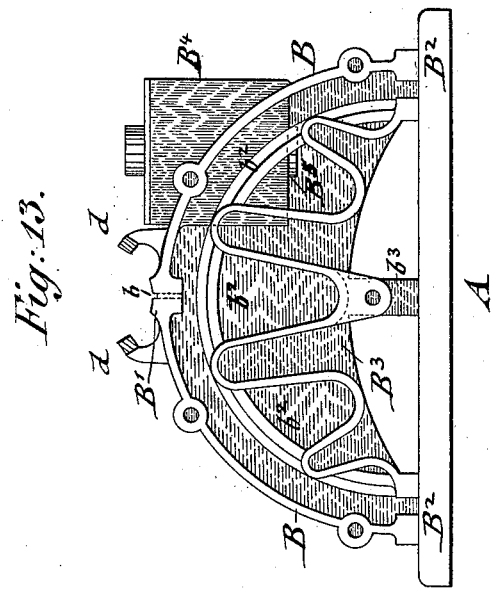
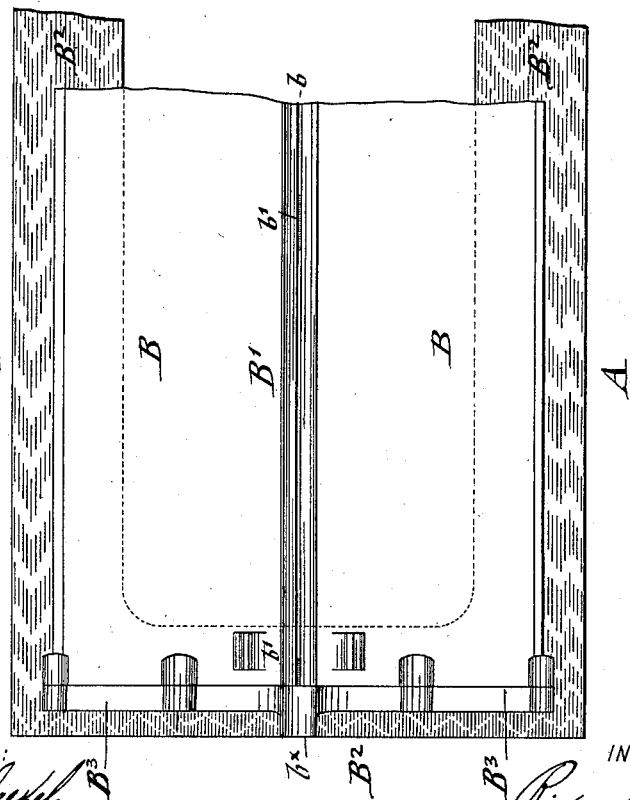

(No Model.) 13 Sheets—Sheet 10.
R. STEEGMÜLLER.
MACHINE FOR SOLDERING SIDE SEAMS OF CAN BODIES.
No. 591,896. Patented Oct. 19, 1897.
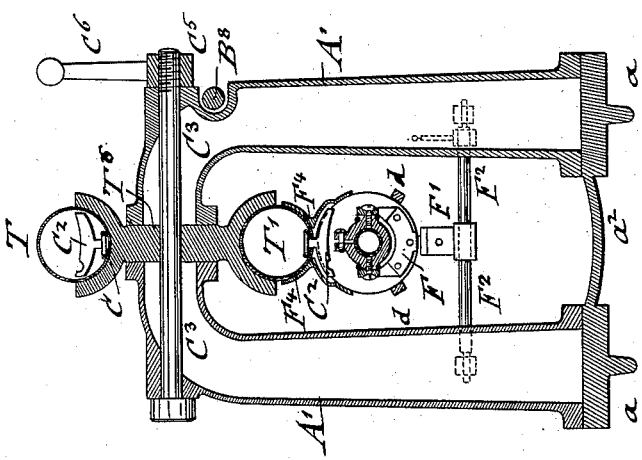
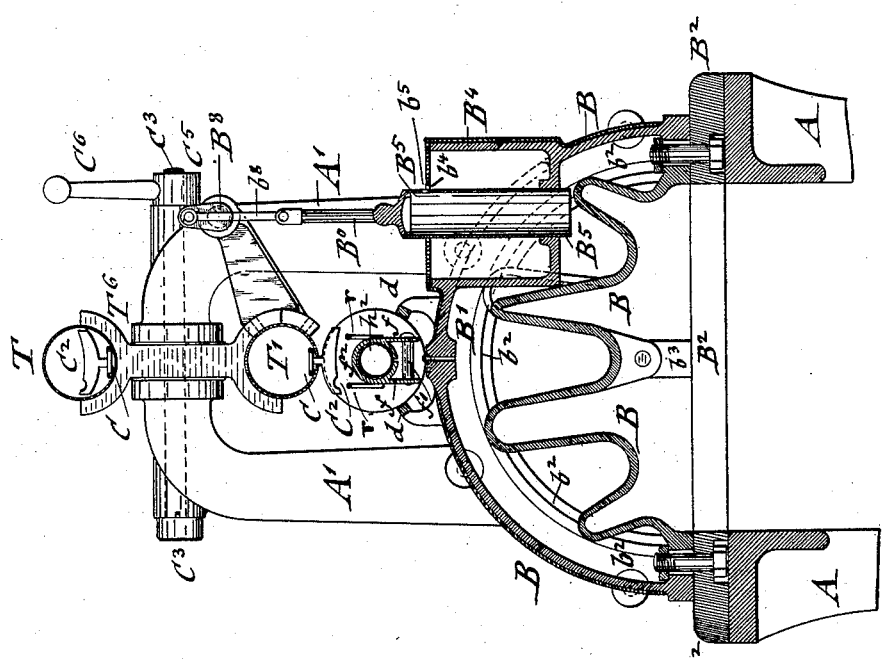

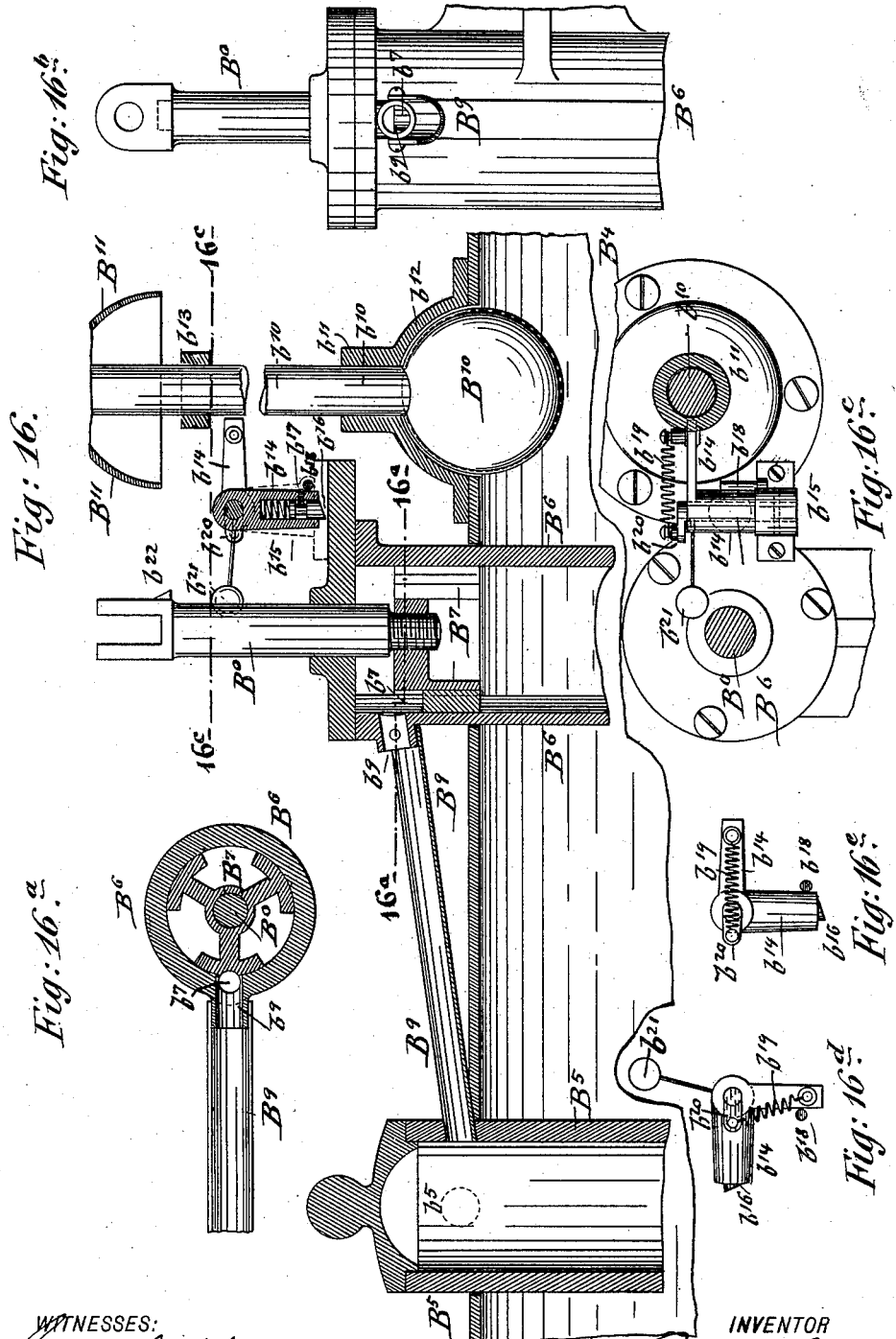

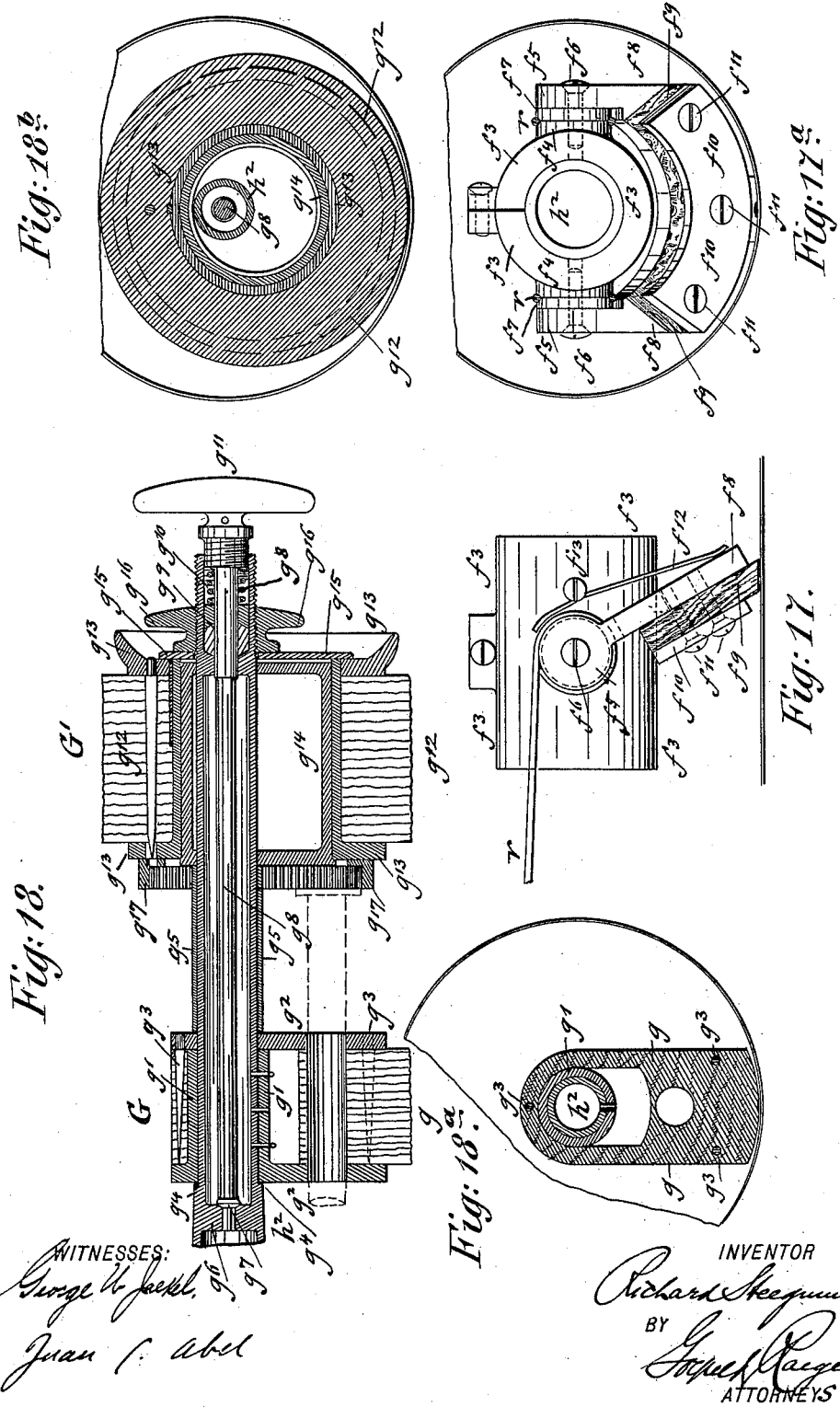

(No Model.) 13 Sheets—Sheet 13.
R. STEEGMÜLLER.
MACHINE FOR SOLDERING SIDE SEAMS OF CAN BODIES.
No. 591,896. Patented Oct. 19, 1897.
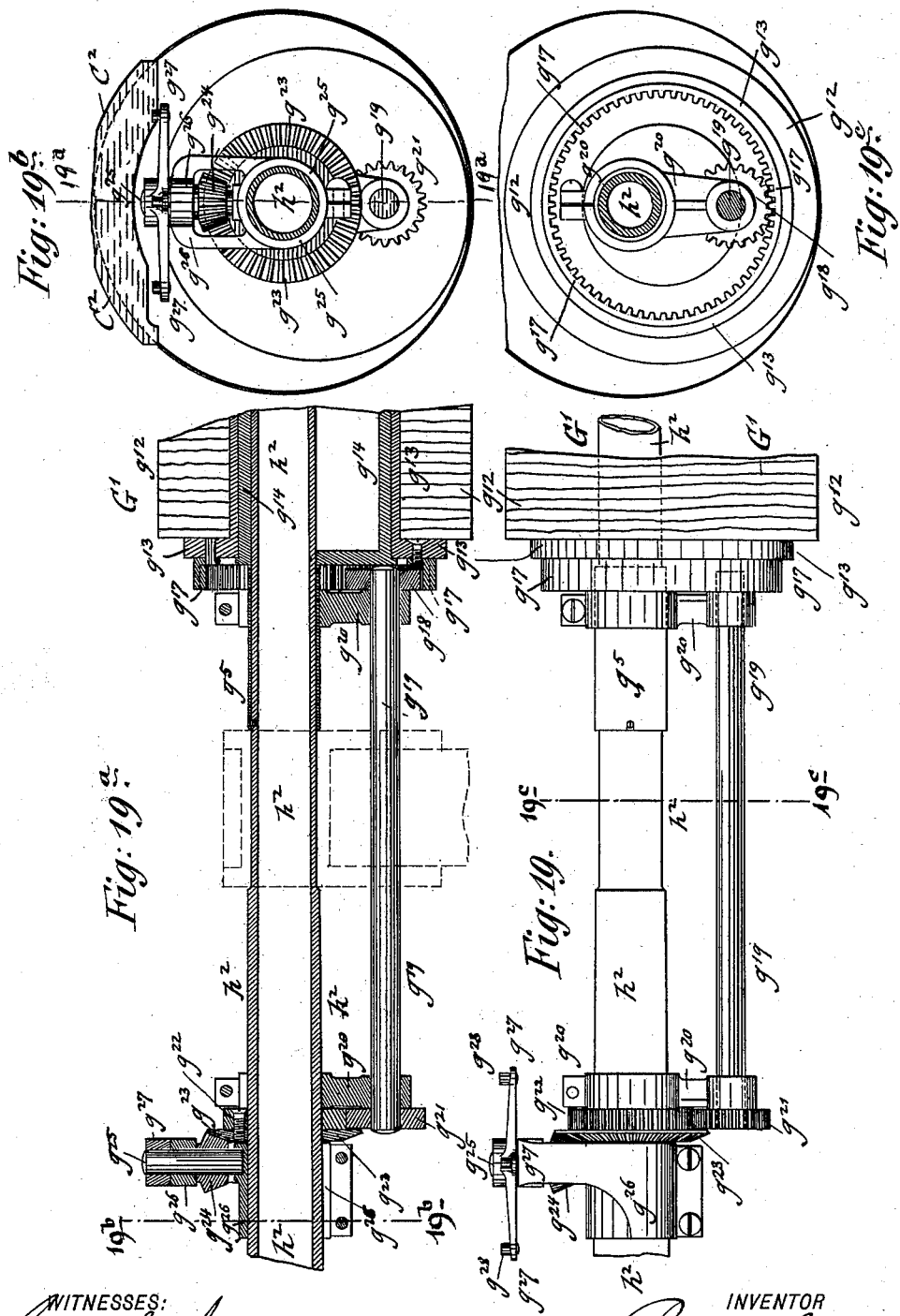

UNITED STATES PATENT OFFICE.

RICHARD STEEGMÜLLER, OF NEW YORK, N. Y., ASSIGNOR TO THE AUTOMATIC CAN MACHINERY COMPANY, OF WESTFIELD, NEW JERSEY.

MACHINE FOR SOLDERING SIDE SEAMS OF CAN-BODIES.

SPECIFICATION forming part of Letters Patent No. 591,896, dated October 19, 1897.

Application filed June 20, 1894. Renewed February 19, 1897. Serial No. 624,198. (No model.)

*To all whom it may concern:*

Be it known that I, RICHARD STEEGMÜLLER, a citizen of the United States, residing in the city, county, and State of New York, have invented certain new and useful Improvements in Machines for Soldering the Side Seams of Can-Bodies, of which the following is a specification.

This invention relates to machines for making sheet-metal cans, and more especially to an improved machine for soldering the side seams of sheet-metal cans or boxes after the can-bodies are made on a can-body forming and seaming machine.

My improved machine is intended to be operated in connection with the can-seaming machine for which Letters Patent were granted to me heretofore, No. 440,411, dated November 11, 1890, and in which the can-body-forming horn is arranged in a vertical position, so that the seamed can-bodies are delivered by gravity from the former-horn to suitable carrying devices, by which they are conducted to the side-seam-soldering devices. For the purpose of conveying the bodies from the vertical former-horn of the seaming-machine to my improved soldering-machine a curved horn extension is used, on which the can-body is dropped from the former-horn by gravity, it being then moved over said horn extension and turned on its axis, so that the side seam of the body is placed at the lower part of the extension and then conducted over acid-supplying wipers and through a soldering-trough to suitable wiping, moistening, cleaning, and drying devices.

As my can-seaming machine referred to is a double machine, having a vertical former-horn at each end, it is my intention to make my side-seam-soldering machine also as a double machine, one for each can-seaming machine, so as to dispose directly of all the can-bodies formed by the double can-seaming machine and produce thereby a double output of cans as compared to the output when only a single can-seaming and side-seam-soldering machine are employed.

The invention consists of a machine for soldering side seams of can-bodies, which comprises a curved extension-horn located vertically below the former-horn of the can-seaming machine, means for moving and turning the can-body on its axis, so as to make the side seam of the same the lower part of the can, carrying devices for moving the can-body through the soldering-machine, means for supplying the acid by suitable absorbent wicks to the inner and outer surfaces of the seam, said acid being supplied from the hollow extension-horn, which serves as an acid-reservoir, a soldering-trough provided with a longitudinal opening and arranged in connection with a soldering-bath, the solder being melted in the tank and supplied in regular quantities by a suitable dipping device to the trough, inner and outer wipers by which the surplus solder is removed from the side seams of the bodies, a stationary wiper for supplying water to the inner surface of the seam of the can for cleaning and cooling the seam, and a rotary drying-brush for removing the cleaning and cooling water supplied to the interior of the can.

The invention consists, further, of certain details in the construction of the different operating parts of my improved side-seam-soldering machine, as will be fully set forth hereinafter and finally pointed out in the claims.

In the accompanying drawings, Figure 1 represents a side elevation of my improved machine for soldering the side seams of can-bodies. Fig. 2 is a side elevation of the left-hand half of the machine, drawn on a larger scale. Fig. 3 is a side elevation of the right-hand half of the machine, also on a larger scale. Figs. 4 and 5 are vertical longitudinal sections, respectively, of the left and right hand halves of the machine shown in Figs. 2 and 3. Figs. 6 and 7 are plan views, likewise at the right and left hand ends of the machine, some parts in both figures being broken away and others being in section. Figs. 8, $8^a$, $8^b$, $8^c$, $8^d$, and $8^e$ are details of the extension-horn, showing its connection with the former horn of the seaming-machine, Fig. $8^c$ being a top view of the horn extension, Figs. $8^d$ and $8^e$ being horizontal sections, respectively, on lines $8^d\ 8^d$ and $8^e\ 8^e$, Figs. 8 and $8^a$. Figs. 9 and $9^a$ are respectively a plan view of the oscillating arms by which the can-body, after being dropped from the former-horn, is moved over the horn extension and a detail section through one of the push-pins of the oscillating arms. Fig. 10 is a vertical transverse section on line 10 10, Fig. 1, drawn on a larger scale. Figs. 10$^a$ and 10$^b$ are details of the guide device by which the side seam of the can-body is placed in proper alinement with the acid-supplying wipers and the soldering-trough. Figs. 11, 11$^a$, 11$^b$, 11$^c$, and 11$^d$ are details of the means for supplying acid to the inner and outer surfaces of the side seam of the cans. Fig. 12 is a plan view of a portion of the soldering-tank and soldering-trough. Fig. 13 is an end elevation of the soldering tank and trough, the end wall of the tank being removed to show the interior construction of the tank. Fig. 14 is a vertical transverse section on line 14 14, Fig. 1, through the soldering-tank, also on a larger scale. Fig. 15 is a vertical transverse section on line 15 15, Fig. 1, drawn on a larger scale. Fig. 16 is a vertical longitudinal section, on a still larger scale, showing the mechanism by which a regular supply of melted solder is kept up to the soldering-tank and an alarm device for the same. Figs. 16$^a$, 16$^b$, 16$^c$, 16$^d$, and 16$^e$ are details of the solder-supplying mechanism and its alarm device, Figs. 16$^a$ and 16$^c$ being horizontal sections, respectively, on lines 16$^a$ 16$^a$ and 16$^c$ 16$^c$, Fig. 16. Figs. 17 and 17$^a$ are details of the inner wiper for removing the surplus solder from the inner surface of the side seam. Figs. 18, 18$^a$, and 18$^b$ are details, respectively, of the brush for supplying cleaning-water to the can-body and of the brush for drying the same. Figs. 19, 19$^a$, 19$^b$, and 19$^c$ are details of the motion-transmitting mechanism for the drying-brush, Fig. 19$^a$ being a longitudinal transverse section on line 19$^a$ 19$^a$, Fig. 19$^b$, and Figs. 19$^b$ and 19$^c$ being vertical transverse sections on lines 19$^b$ 19$^b$ and 19$^c$ 19$^c$, Figs. 19$^a$ and 19, respectively.

Similar letters of reference indicate corresponding parts.

Referring to the drawings, A represents the supporting-frame of my improved machine for soldering the side seams of can-bodies. On the supporting-frame A is arranged the soldering-tank B, which is heated in any suitable manner.

To the end walls of the solder-bath B are applied horizontal brackets or pedestals $a$, on which are supported yoke-shaped standards A', which serve to support the upper and lower horizontal tubes T T', through which the endless can-body carrier-chain is passed, said chain being composed of a number of links, some of which are provided with pushers by which the can-bodies are moved forward, the links being guided over suitable sprocket-wheels T$^2$ near the opposite ends of the guide-tubes T T'. A horn extension H' is arranged adjacent to the sprocket-wheel T$^2$, at the ingoing end of the machine, and made of curved shape, its upper end being located below the can-body former-horn H of the can-seaming machine, so that the can-bodies are dropped without any special forwarding mechanism directly by gravity on the horn extension H'. The horn extension H' is made hollow and serves as an acid-receptacle.

To the lower end of the horn extension H' is attached an acid-tube $h$, while in the horn, horn extension, and in the acid-tube $h$ is arranged a water-supply tube $h'$, by which the water is conducted into the water-tube $h^2$. Adjacent to the lower end of the horn extension H' is arranged on the acid-tube $h$ a guide D, by which the side seams of the can-bodies are directed, and adjacent to it an acid-tank E with its acid-delivery wicks, said tank communicating with the acid-tube $h$. The can-bodies are conveyed by the pushers of the carrier-chain over suitable guide-rails $d$ $d$, directly from the guide D and acid-wicks to the soldering-trough B' of the tank B, and from the same to the inner and outer wipers F F', for removing the surplus solder, so as to furnish a neat and uniform seam, said outer wiper being arranged on the right-hand pillar A' of the supporting-frame A. Water is supplied to a wiper G, for cleaning and cooling the seam, which is then subjected to the motion of a rotary drying-brush G' for drying the can, the surplus water being collected in a drip-tank G$^2$ at the right-hand end of the machine.

The operative parts of the machine having thus been briefly referred to, they will now be described in detail, each under a special appropriate heading.

The Horn Extension.

The horn extension H' is clearly shown in Figs. 4, 8, and 8$^e$. It is formed of a hollow curved casting of suitable metal, which is closed at the upper and lower ends and connected by suitable screws $h^{\times}$, which are located in recesses at the opposite sides of the upper end of the horn extension with the lower end of the former-horn H of the can-seaming machine. The horn extension H' receives its supply of acid by an acid-supply tube $h^3$, which passes through the body of the horn H, while the water-supply tube $h'$ passes also through the body of the horn H, the horn extension H', and the acid-tube $h$ to the water-tube $h^2$, which extends longitudinally midway between the guide-rails $d$ $d$. The water-tube $h^2$ abuts against the end of the acid-tube $h$, and is tightly connected at the closed end of the acid-tube with the water-supply tube $h'$, as shown in Fig. 4. The water-tube $h^2$ gradually diminishes in diameter from one end to the other.

The lower end of the horn extension H' is connected by means of screws to the flanged end or collar of the acid-tube $h$, so that the end of the acid-tube is firmly supported thereby. The horn extension H' is provided at one side of its upper part with an inclined recess $h^4$, which communicates with the recess for the side seam in the horn H, said recess $h^4$ being of rhombic shape and serving to produce the turning of the can-body on its axis, while it is dropped from the horn onto the horn extension, so that the side seam is conducted into a central groove $h^5$, that extends centrally along the middle and lower parts of the horn extension, as shown in Figs. 8 and 8ª. The inclined recess $h^4$ serves to impart to the can-body a quarter-turn, so that the side seam is at the lower part of the horn extension when the can-body passes from the horn extension onto the horizontal guide-rails $d\ d$. The size of the horn extension H' is gradually diminished from the upper toward the lower end, so that the can-bodies readily pass over the curved extension without binding thereon. The horn extension H' is further provided at opposite sides with arc-shaped recesses $h^6$, into which project the ends of lateral push-pins $h^7$, that are supported in sockets $h^8$ of oscillating arms H² of a can-body-delivering mechanism, which arms are fulcrumed to suitable supports on the sprocket-wheel-supporting brackets T⁴, attached to an upright stay T³, located between the ends of the guide-tubes T T' of the carrier-chain, as shown in Figs. 2 and 4, and in detail in Fig. 9. The push-pins $h^7$ are provided with slightly-beveled ends, and with shanks of smaller diameter, which are guided in the sockets $h^8$ at the outer ends of the oscillating arms H² and cushioned by helical cushioning-springs $h^9$, which are placed on the shanks of the push-pins between the heads of the push-pins and the closed ends of the sockets $h^8$, as shown in Fig. 9ª. A key $h^{10}$ is passed through the outer end of the shank of each push-pin $h^7$, said key preventing the detaching of the push-pin $h^7$ from the socket $h^8$ of the oscillating arm H² and limiting the extent of forward motion of the pin under the influence of its cushioning-spring.

The oscillating arms H² of the can-body-delivering device are provided with crank-arms $h^{11}$, to which connecting-rods are pivoted that are operated by suitable mechanism, so that oscillating motion is imparted to the arms H² and push-pins $h^7$, whereby with each downward stroke of said arms a can-body is fed in a downward direction and over the lower end of the horn extension onto the guide-rails $d\ d$, so as to be in the path of the pushers of the carrier-chain. During the downward motion of the oscillating arm H² the next can-body which has been dropped from the seaming-machine follows by gravity the motion of the arms until it arrives at the middle portion of the horn extension. As soon as the return motion of the oscillating arms commences the push-pins $h^7$ pass over the sides of the cans, they being pressed sufficiently into the guide-sockets against the tension of their cushioning-springs, so that the can-body engages by its upper edge one of several notches $h^{12}$ at the inner curved portion of the horn extension, as shown in Figs. 2 and 8, and is thereby prevented from being moved toward the upper part of the horn extension during the upward motion of the oscillating arms. By the next downward motion of the oscillating arms this can-body is moved over the lower end of the horn extension onto the guide-rails $d\ d$, and over the same by the pushers of the carrier-chain through the entire machine to the opposite side of the same.

The guide-rails $d\ d$ are supported in suitable position on the soldering-tank B of the machine and serve to guide the cans along the acid-tube $h$ and water-tube $h^2$ over the different parts of the machine. The outermost end of the water-tube $h^2$ is supported by two longitudinal wire rods $r\ r$, that are attached at the inner ends to the horn extension, and at their outer ends to a tube-carrying sleeve $f^3$, said rods serving to keep the water-tube firmly in position. The oscillating arms H² deliver one can-body after the other, as soon as the same has cleared the lower end of the horn extension, to the fixed guide device D, which is shown in details in Figs. 10ª and 10ᵇ and which is provided at its lower part with converging flanges $d'$, said guide device being made in the nature of a sleeve that fits tightly around the acid-tube $h$, and is retained thereon by a transverse screw-bolt $d^2$, which passes through bosses on the outside of the converging flanges. The converging flanges $d'$ serve to produce the accurate centering of the side seam of the can-body, so that the same is brought into line with the acid-delivery wicks and the trough of the soldering-bath. As the can arrives in position over the guide D it is taken up by one of the pushers of the carrier-chain and moved through the entire soldering-machine until it is delivered over the downwardly-inclined ends of the guide-rails $d\ d$ at the outgoing end of the machine to a can-body-heading machine, by which the top and bottom are placed on the can-body.

*The Can-Body Carrier-Chain.*

The mechanism for moving the can-bodies in a longitudinal direction through the machine, so that the body can be successively supplied with the required quantity of acid and solder and conducted beyond the wipers for the surplus solder and the water-supplying and drying brushes, is composed of an endless carrier-chain C, which is formed of a number of pivoted links, which are stretched over the sprocket-wheels T² T², one at each end of the machine, one of the sprocket-wheels T² being supported in bearings of the stationary brackets T⁴, the other in bearings of adjustable brackets T⁵, attached to the outermost supporting-stays T³ of the guide-tubes T T'. The guide-tubes T T' are supported in stays T⁶ at the upper ends of the yoke-shaped pillars A', as shown clearly in Figs. 1, 2, and 3. The driving sprocket-wheel T² is arranged at the outgoing end of the machine, and is supported in the adjustable brackets T⁵, so as to provide means for keeping the carrier-chain perfectly taut. For this purpose an adjusting-screw $C'$ is arranged, that engages the supporting-brackets $T^5$ of the driving sprocket-wheel $T^2$, said brackets being guided along the stay $T^3$, while the inner end of the adjusting-screw $C'$ engages the transverse connecting-piece of the brackets $T^5$. The turning of the screw $C'$ in one or the other direction produces the forward or backward adjustment of the brackets $T^5$ and thereby the tightening or loosening of the carrier-chain $C$.

The carrier-chain is made of a number of links, which are engaged by the teeth of the sprocket-wheels $T^2$. The chain $C$ is provided at equal distances from each other with pushers $C^2$, the shape of which is clearly shown in detail in Figs. 10, 14, 15, and $19^b$. These pushers are preferably attached at such distances from each other on the links of the chain that one can-body after the other is taken up by the pushers and fed longitudinally through the machine. The parallel guide-tubes serve for supporting the upper and lower lengths of the endless carrier-chain, the lower guide-tube being provided with a longitudinal center slot in which the shanks of the pushers are guided. The supporting-stays $T^6$ of the guide-tubes $T T'$ are clamped to the yoke-shaped pillars $A'$ of the machine by means of transverse screw-bolts $C^3$, one of the stays $T^6$ being provided with a horizontal slot $C^4$, so as to provide for the contraction or expansion of the guide-tubes under the varying temperatures to which the machine is subjected, without straining the supporting-tubes and chain. The slot $C^4$ is shown in Fig. 5, the transverse screw-bolt $C^3$ being tightly clamped to the supporting-pillar $A'$ by means of a screw-nut $C^5$, provided with a handle $C^6$, by which the connection of the stay $T^6$ and the pillar $A'$ is produced.

*The Acid-Delivery Wicks and Acid-Tank.*

The acid-wicks and the acid-tank are clearly shown in detail in Figs. 11 to $11^d$ and consist of a sleeve $e$, that is clamped to the acid-tube $h$, and provided at its lower part with downwardly-extending parallel flanges $e'$. The flanges $e'$ are connected by transverse screws $e^2$, so that a wick $e^3$ of suitable absorbent material is firmly held between the parallel flanges $e'$. The acid-tube $h$ is provided above the wick $e^3$ with small perforations, through which the acid is delivered in small drops onto the wick $e^3$. The inner faces of the flanges $e'$ are provided with grooves or channels $e^4$, so that any surplus acid that cannot be absorbed by the wick is dropped on a wick $e^5$ below the wick $e^3$, and is conducted by the latter into the acid-tank $E$, which is located below the delivery-wick and made longer than the same, so as to prevent the spilling and loss of acid.

To the bottom of the acid-tank $E$ is attached by screws $e^7$ an L-shaped guide-plate $e^6$, which is provided in its vertical part with an opening for the wick $e^5$, as shown clearly in Figs. 11 and $11^a$. Alongside of the upper end of the L-shaped guide-plate $e^6$ are arranged two parallel jaws $e^8$, having abutting end cheeks $e^9$ connected by screws $e^{10}$, said jaws being provided with vertical grooves at their inner faces and connected by pivot-links $e^{11}$ with the lower portion or base of the guide-plate $e^6$, one of said pivot-links being connected by a helical spring $e^{12}$ with the said base, so that the front ends of the jaws $e^8$ are pressed against a stop-screw $e^{13}$, that passes through the front wall of the acid-tank $E$.

Between the grooved jaws $e^8$ is supported the lower wick $e^5$, the lower end of which is extended through the opening in the L-shaped guide-plates into the acid-tank, as shown in Fig. 11, so that the wick takes up acid by capillary attraction when the tank is filled, and supplies it to the outer surface of the side seam of the can-body, while the upper or delivery wick $e^3$ supplies the acid to the inner surface of the side seam as the can-body is passed by the carrier-chain through between the wicks. When the seam of the can-body arrives in line with the wicks $e^3 e^5$, it pushes the lower jaws $e^8$ against the tension of the spring $e^{12}$ on the pivot-links $e^{11}$ back until a sufficient space is provided for the entering side seam of the can-body, so that it can be moved forward between the wicks, which are pressed on the inner and outer surfaces of the side seam, and supply a sufficient quantity of acid thereto as is necessary for the proper soldering of the seam. Any surplus acid that is delivered by the delivery-wick $e^3$ is collected in the acid-tank, which is provided with an overflow-pipe $e^{14}$ at its upper part, through which the surplus acid is conducted off when it arrives on a level with the lower edge of the overflow-pipe $e^{14}$. The overflow acid is collected in a suitable vessel and returned to the acid-supply vessel in the horn extension, so as to be conducted from the same back to the acid-delivery wick and acid-tank. The acid-tank $E$ is supported by the yoke-shaped pillar $A'$, it being retained by ribs $e^{15}$ at one end of the same, between ribs $e^{16}$ on the tapering inner faces of the pillar $A'$, as shown in Figs. 2 and 10.

*The Soldering-Tank and the Solder-Supplying Mechanism.*

The can-body is conducted over longitudinal steadying-flanges $f f$, which are attached by a tubular upper portion $f^2$ and transverse clamping-bolts $f'$ to the water-tube $h^2$. At the upper part of the soldering-tank $B$ is arranged a longitudinal soldering-trough $B'$, which is provided with a central slot $b$, which is connected at certain intervals by transverse stays $b'$, that extend below the slot. The upper edges of the soldering-trough $B'$ are made slightly tapering toward the slot, as shown in Fig. 13, so that the side seam of the can-body can freely pass through the trough thus obtained and is thereby covered both at the inside and outside of the seam with liquid solder. The shape of the tank is shown in Figs. 13 and 14, the top of the tank being made of semicylindrical shape, while the bottom is made corrugated, so as to furnish a larger surface to the flames of the products of combustion by which the soldering-tank is heated.

The top and bottom of the soldering-tank B are attached by screw-bolts to an open bed-plate $B^2$, which is supported on the supporting-stand A. The corrugations of the bottom are connected at suitable intervals by means of transverse arc-shaped connecting-pieces $b^2$, which act as stays for the corrugations. The end walls $B^3$ of the solder-tank are attached, by means of screw-bolts, to the sockets of the top and to lugs $b^3$ of the bottom of the solder-tank, as shown in Figs. 10 and 13. On the soldering-tank B is arranged a solder-supplying mechanism, which is shown in detail in Figs. $16^a$ to $16^e$, said solder-supplying mechanism consisting of an oblong receptacle $B^4$, which extends through the top wall of the soldering-tank at one side of the soldering-trough, as shown in Figs. 1 and 13, and which is provided with two cylinders $B^5$ $B^6$, one being provided with a detachable lid, while the other is provided with a vertically-reciprocating dipper $B^7$, which lifts at each upstroke a small quantity of liquid solder from the lower part of the receptacle $B^4$ to the upper part of the cylinder $B^6$. The receptacle $B^4$ is closed at the top, its side and end walls, as well as the outer surface of the soldering-tank, being covered by a layer of suitable non-conducting material, so that the radiation of heat is prevented and the solder in the same retained in liquid state. The lower end of the cylinder $B^4$ opens into the tank B, and the lower end of the cylinder $B^6$ into the receptacle $B^4$. Vertically-reciprocating motion is imparted to the dipper $B^7$ in the cylinder $B^6$ by means of a rotating crank-shaft $B^8$, the crank of which is connected, by an intermediate connecting-rod $b^8$, with the dipper-rod $B^9$, said crank-shaft receiving rotary motion by a bevel-gear from the shaft of the driving sprocket-wheel $T^2$, said transmitting mechanism being clearly shown in Figs. 1 and 3. The crank-shaft $B^8$ makes two rotations for every rotation of the driving-shaft of the sprocket-wheel $T^2$, to which driving-shaft rotary motion is imparted by a suitable belt-and-pulley transmission. (Shown in Fig. 5.) For each rotation of the shaft of the driving sprocket-wheel, two cans are fed forward by the carrier-chain, and two rotations of the crank-shaft and two strokes of the dipper are produced, so that as the liquid solder is supplied to the cans a corresponding quantity of solder is supplied to the tank and trough.

For supplying the proper quantity of solder to the side seam of the can-body, it is necessary that the soldering-trough should be always supplied with liquid solder, so that each can as it passes through the entire length of the soldering-trough is coated at the inner and outer surfaces with solder. The level of the liquid in the soldering-trough is regulated by the level of the liquid in the cylinder $B^5$, said cylinder being provided at its outer wall with an opening $b^5$, through which any surplus solder passes to the outside and is returned through an opening $b^4$ in the top of the receptacle $B^4$ into the latter, as shown in Fig. 14.

The level of the liquid in the cylinder $B^5$, and therefore in the soldering-trough, is kept up by the cylinder $B^6$ and the dipper $B^7$, which latter, on arriving at the upper end of the cylinder $B^6$, discharges a small quantity of liquid solder that is carried up in the pocket of the dipper $B^7$ into an inclined connecting-gutter $B^9$, which extends from the discharge-opening $b^9$ in the upper end of the cylinder $B^6$ into the upper part of the cylinder $B^5$, as shown in Fig. 16. The dipper $B^7$ is guided in the cylinder $B^6$ by three radial arms having segmental guide-wings, as shown in Figs. 16 and $16^a$, the segmental wing arranged in line with the gutter $B^9$ being provided in its circumference with a pocket $b^7$, that is formed by a recess in the upper part of the wing, and by a rib $r^x$ at the lower part of the wing, which rib extends into a vertical groove $b^0$ in the cylinder $B^5$, as shown clearly in Fig. 16. At each downstroke of the dipper $B^7$ the same is submerged into the liquid solder in the cylinder $B^6$, so that by the upward stroke of the same a small quantity of solder is carried along in the pocket of the dipper. As the pocket in the dipper arrives on a level with the discharge-opening $b^9$ at the upper part of the cylinder $B^6$ the liquid solder is discharged into the gutter $B^9$ and from the same into the cylinder $B^5$, the quantity supplied by each upward stroke of the dipper being sufficient for replacing the quantity of solder supplied to each can-body, so that as two cans are moved forward for each rotation of the shaft of the driving sprocket-wheel of the carrier-chain, and as two strokes of the dipper are produced the quantity of solder taken up by the cans is continually supplied again by the dipper, and thereby the required level of the solder in the tank and trough sustained. As the supply-cylinder $B^6$ and the level-regulating cylinder $B^5$ are open to the atmosphere, the restoring of the level of the solder in the soldering-trough is kept up in a reliable manner by gravity without producing any spilling of solder over the edges of the soldering-trough. Any surplus solder is returned through the overflow-opening $b^5$ in the cylinder $B^5$ and opening $b^4$ into the tank $B^4$, as before described. The receptacle $B^4$ is filled from time to time with solid bars of solder, which, as they are gradually melted by the heat supplied to the bottom of the tank and receptacle, are changed into a liquid state and are gradually supplied by the dipper to the tank in the manner described.

As the stroke of the dipper $B^7$ remains uniform, it is obvious that by adjusting the dipper $B^7$ in a higher or lower position on the dipper-rod $B^0$, more or less solder is supplied to the tank, the dipper when in its higher position transmitting more solder at each upstroke from the pocket $b^7$ to the gutter $B^9$ than when in its lower position on the dipper-rod $B^0$.

In connection with the solder-receptacle $B^4$ is arranged an alarm device, by which warning is given whenever the level of the liquid in the soldering-receptacle commences to fall to such an extent that the seams of the can-bodies would not be properly supplied with solder. This alarm device is shown in Figs. 16, $16^c$, $16^d$, and $16^e$, and consists of a float $B^{10}$, the stem $b^{10}$ of which is guided in a sleeve $b^{11}$, that is arranged at the upper end of a hemispherical shell $b^{12}$, which is attached to the top of the solder-receptacle $B^4$, as shown in Fig. 16. To the upper end of the stem of the float $B^{10}$ is attached a bell $B^{11}$, and below the bell attached to the stem a collar $b^{13}$, which engages the upper arm of a bell-crank lever $b^{14}$, that is fulcrumed to a supporting-post $b^{15}$ on the top of the cylinder $B^6$. The lower arm of the bell-crank lever $b^{14}$ is made in the form of a socket and provided with a beveled and spring-cushioned pin $b^{16}$, that is retained in the socket by a set-screw $b^{17}$, engaging a circumferential groove in the shank of the pin, as shown in Fig. 16. The lower socket-shaped arm of the bell-crank lever $b^{14}$ abuts against a fixed pin $b^{18}$ on the supporting-post $b^{15}$, while the upper arm is connected by a spiral spring $b^{19}$ with a stationary crank-arm $b^{20}$ on the pivot of the bell-crank lever $b^{14}$, as shown in Figs. $16^c$, $16^d$, and $16^e$. When a considerable quantity of solder in the solder-receptacle is used up, the level of the liquid falls and the float $B^{10}$ is lowered, and the collar $b^{13}$ on the stem of the float engages the upper arm of the bell-crank lever $b^{14}$ and lowers the same sufficiently below its horizontal position so that it is acted upon by the helical spring $b^{19}$ and turned quickly into the position shown in Fig. $16^d$, until it is arrested by the pin $b^{18}$. A clapper $b^{21}$, which is attached to the bell-crank lever $b^{14}$ in line with the upper arm of the same, strikes the bell $B^{11}$ when the tilting of the bell-crank lever takes place, and gives thereby the signal to the attendant which indicates that a new supply of solder is required. By the next downward motion of the dipper $B^7$ a projecting nose $b^{22}$ on the stem of the same engages the projecting end of the beveled pin $b^{16}$, arranged in the socket-shaped arm of the bell-crank lever $b^{14}$, and moves the same in a downward direction until it clears the pins $b^{16}$, so that by the action of the spring $b^{19}$ another stroke of the clapper on the bell is produced, which is repeated with each downstroke of the dipper-rod $B^0$, so that the ringing of the bell is kept up until a new supply of solder is placed into the receptacle $B^4$. The spring-cushioning of the beveled pin $b^{16}$ is necessary, so as to provide for the passage of the nose $b^{22}$ beyond the pin $b^{16}$ during the upstroke of the dipper-rod. As long as the supply of solder is not replenished, the ringing of the bell takes place intermittently, so that the attendant is warned and his attention drawn to the necessity of a new supply of solder. When new bars of solder are supplied to the receptacle, the level of liquid solder is raised and the float returned to its normal position. The bell-striking device is then returned into its former position by the attendant. As long as the float $B^{10}$ is kept in contact with the shell $b^{12}$ at the upper part of the receptacle $B^4$, the alarm is not sounded, the normal position of the alarm-bell relatively to the actuating bell-crank lever indicating that there is a sufficient supply of solder in the soldering tank and trough.

During the movement of each can through the soldering-trough, by the action of the carrier-chain, the side seam of the same is submerged in the liquid solder, so that the same coats the inside and outside surfaces of the side seam and enters into every depression formed by the folded edges of the metal, so that the reliable closing of the side seam is obtained. The ends of the soldering-trough B' are provided with outwardly-extending beveled lips $b^\times$, which are clearly shown in Figs. 4, 5, and 12, which prevent the overflow of solder at the ends of the trough, and over which the side seam of the can-body is passed as the same enters into or leaves the soldering-trough B'. The guide-rods $d\,d$ are slightly thickened above the ingoing and outgoing ends of the trough B', so that the side seam is slightly raised and permitted to pass over the beveled lips $b^\times$. As the parallel can-body-retaining flanges $f\,f$ extend from one end of the tank to the other alongside of the trough, the side seam is retained immersed in the solder during its passage through the trough, so that the reliable soldering of the seam is accomplished.

The Wipers for the Surplus Solder.

As soon as the seam of the can-body leaves the lip $b^\times$ of the soldering-trough B' it passes between an interior wiper F and an exterior wiper F', of which the former is supported on the water-tube $h^2$ and the latter on the transverse rod $F^2$ of the yoke-shaped pillar A' at the outgoing end of the soldering-tank B, as shown in Figs. 5 and 15, and in detail in Figs. 17 and $17^a$. The interior wiper F is supported by a collar $f^3$ on the water-supply tube $h^2$ and is provided at opposite sides with sockets $f^4$ for receiving the pivots $f^6$, by which the side lugs $f^5$ of the wiper F are applied to the collar $f^3$. Between the sockets $f^4$ of the wiper F and the lugs $f^5$ are introduced washers $f^7$, said sockets and washers being grooved at their adjacent edges for attaching the ends of the parallel and slightly-inclined wires $r$, which wires' ends are bent around the grooved sockets and washers and soldered thereto.

The wires $r$ serve to support the water-tube $h^2$ firmly in position and prevent it from interfering with the free motion of the can-bodies in longitudinal direction through the machine. The wiper F is composed of a segmental lower portion, a piece of absorbent non-combustible material $f^9$, such as asbestos felt, and a fastening-plate $f^{10}$, which is attached by means of screws $f^{11}$ to the segmental lower portion of the wiper F, as shown in Fig. 17$^a$. The inner surface of the side seam of the can-body passes along the lower edge of the wiping-felt, so that any surplus solder is wiped off as the can is moved forward by the carrier-chain, the surplus solder dropping on a transverse drip-plate $a^2$, extending between the supporting-brackets on which the yoke-shaped pillar A' is supported, as shown clearly in Fig. 15. On this slightly-concaved drip-plate the solder is dropped and hardened by contact with the same, from which it is removed from time to time.

A slight downward pressure is imparted to the wiper F by means of a spring $f^{12}$ at each side of the collar $f^3$, which is attached to a screw-stud $f^{13}$ of the collar $f^3$, as shown in Fig. 17, so that a slight pressure is exerted by the wiper on the inner surface of the side seam as the can-body passes below the wiper. The supporting-rod F$^2$ of the exterior wiper F' is supported on ears of the pillar A', as shown in Figs. 5 and 15, said wiper being made in the same manner as the interior wiper, but of less width than the same. It is likewise connected by helical springs $f^{14}$ with the pillar A', so as to be pressed with a certain pressure against the outer surface of the seam and remove the surplus solder from the same, said solder being also dropped on the drip-plate $a^2$, as before described. During the passage of the can-body over the exterior wiper F' it is necessary to hold the can in position against the pressure of the same. This is accomplished by means of a stationary abutment F$^4$, which is shown in Figs. 3, 5, and 15, and which is attached to the lower guide-tube T' for the carrier-chain, said abutment pressing by arc-shaped flanges at opposite points on the can, at points approximately vertically above the guide-rails for the cans. This abutment extends for approximately the length of a can-body over the wipers, so as to produce the reliable action of the exterior wiper F' during the passage of the can-body between both wipers F F'.

*The Seam Cleaning and Drying Devices.*

From the wipers the can-body is moved over the guide-rails until it arrives below the stationary wiper G, which serves to supply water from the water-tube $h^2$ to the interior of the can. This water-supplying wiper G consists of a number of layers $g$, of felt or other suitable absorbent material, which are perforated so as to be readily placed in position over a sleeve $g'$, attached to one head $g^2$ of the wiper, said sleeve being placed on the water-tube $h^2$, as shown in Fig. 18. The absorbent layers $g$ are supplied with water, through perforations in the water-tube $h^2$ and sleeve $g'$, so that a sufficient quantity of moisture is supplied to inner surface of the side seam. The absorbent layers $g$ are retained in position by means of the opposite head $g^2$ and by three or more pointed pins $g^3$, which pierce the upper and lower ends of the layers, so as to retain them firmly in position and prevent them from shifting. The wiper G is retained firmly in the water-tube by means of a shoulder $g^4$ in the same and a sleeve $g^5$, which presses on the opposite head $g^2$ and holds it and the layers $g$ in position. In the lower parts of the layers $g$ is arranged an opening for the passage of an auxiliary shaft, by which motion is transmitted to the rotary drying-brush G', as will be described hereinafter. The water-tube $h^2$ is provided adjacent to the wiper G with an interior web $g^6$, having a central opening, which can be partly or entirely closed by a valve $g^7$, the stem $g^8$ of which extends longitudinally through the outermost end of the water-tube $h^2$, and through a stuffing-box $g^9$, by which the escape of water is prevented.

Between the stuffing-box $g^9$ and the screw-threaded end of the stem $g^8$ is interposed a spiral spring $g^{10}$, which presses on the stuffing-box and keeps the packing of the same perfectly tight. When the valve $g^7$ is screwed on its seat in the web $g^6$, no water can pass into the outermost end of the water-tube $h^2$ and to the wiper G. When the valve $g^7$ is opened by turning the handle $g^{11}$ at the outer end of the stem $g^8$, water is supplied to the end of the water-tube $h^2$ and conducted through the apertures in the same to the absorbent layers of the cleaning-wiper G, as shown in Figs. 18 and 18$^a$. Any surplus water is delivered from the can-body into the tank G$^2$ and conducted off through a waste-pipe G$^3$, arranged in the pillar G$^4$ of the same, as shown in Figs. 3 and 5. The ends of the guide-rails $d$ are supported by brackets on the tank, as shown in Figs. 3 and 5, so that a perfectly rigid position is imparted to the same. After the side seam of the can-body has passed the cleaning-wiper G it is necessary to remove the moisture from the seam and to dry the can. This is accomplished by a rotary drying-brush G', which is supported on the outer end of the water-tube $h^2$, and which is constructed in the same manner as the wiper G of a number of absorbent layers G$^{12}$, which are firmly held between heads $g^{13}$, as shown in Fig. 18. The heads $g^{13}$ are supported on a cylinder $g^{14}$, that is supported eccentrically to the water-tube $h^2$, as shown in Figs. 18 and 18$^b$, said cylinder being held in position on the water-tube at one end by the sleeve $g^5$, interposed between the cleaning-wiper G and the eccentric cylinder $g^{14}$ of the drying-brush, and at the other end by a disk-shaped washer $g^{15}$ and screw-nut $g^{16}$, said screw-nut engaging the exteriorly-threaded outermost end of the water-tube $h$. The washer $g^{15}$ is pressed at its inner yielding portion by the screw-nut $g^{16}$ against the face of the cylinder $g^{14}$, so as to prevent it from turning on the water-tube $h$. The washer $g^{15}$ and screw-nut $g^{16}$ serve also for the purpose of pressing the layers $g^{12}$ together tightly and to squeeze them from time to time, so as to remove the surplus water absorbed by the same.

Intermittent rotary motion is imparted to the drying-brush $G'$ by means of an internal gear-wheel $g^{17}$, which is attached to one head $g^{13}$ of the drying-brush, said internal gear-wheel being engaged by a pinion $g^{18}$ at the end of the auxiliary shaft $g^{19}$, which is supported in hanger-bearings $g^{20}$ on the water-tube $h^2$, as shown in Figs. 19, 19$^a$, and 19$^b$. To the opposite end of the auxiliary shaft $g^{19}$ is applied a second pinion $g^{21}$, which meshes with a gear-wheel $g^{22}$, supported loosely on the water-tube $h^2$. To the gear-wheel $g^{22}$ is attached a gear-wheel $g^{23}$, which meshes with a bevel-pinion $g^{24}$, the shaft of which, $g^{25}$, is supported in suitable step and neck bearings arranged on a sleeve $g^{26}$, that is clamped to the water-tube $h^2$, as shown in Figs. 19$^b$ and 19$^c$.

To the upper end of the short pinion-shaft $g^{25}$ are attached radial arms $g^{27}$, which carry upwardly-projecting pins $g^{28}$, that are engaged by one end of the can-pushers C$^2$ of the carrier-chain C, the opposite ends of the can-pushers being recessed, so as to pass over the opposite pins of the arms $g^{27}$ without engaging the same, as shown in Fig. 19$^b$. By the forward motion of the can-pushers C$^2$ the radial arms $g^{27}$ are turned nearly for a quarter of a rotation, so that the transmitting-gearing imparts a partial rotation to the drying-brush G$'$, whereby the cleaning-water is removed by absorption from the inside of the can, and especially from the inner surface of the side seam, owing to the eccentric position of the drying-brush on the water-tube by which it forms mainly contact with the lower part of the can-body, as shown in Figs. 18$^b$, 19$^b$, and 19$^c$. As each can-pusher C$^2$ engages one of the actuating-arms $g^{27}$ of the transmitting-gearing each can-body is acted upon in the same manner by the drying-brush G$'$, from which the water is evaporated partly by the heat of the can and partly by evaporation, owing to the larger circumference of the brush. The can-body is then conveyed after being cleaned and dried to the ends of the guide-rails, and then conducted off from the machine.

By the cleaning action of the water on the soldered side seam the acid is removed and the side seam cooled off, while by the action of the drying-brush the water is removed, so that the soldered cans are conducted off, free from any acid, and can be directly transferred to the heading-machine, without requiring any special cooling devices on their way to the heading-machine.

*Operation of the Machine.*

The operation of the machine has been to some extent described in connection with the parts composing the same, so that only a brief and connected description is necessary.

As the can-bodies are successively dropped by gravity from the vertical can-body former-horn of the can-seaming machine, they drop on the curved horn extension of the side-seam-soldering machine and are then taken up by the oscillating conveyer-arms and pushed in a downward direction over the curved horn, which is for this purpose diminished in width at its middle portion and in the direction of the longitudinal axis of the machine. One can-body after the other is thus transmitted by the oscillating conveyer-arms onto the supporting guide-rails of the can. During the downward motion of the can over the horn extension the sides of the can-bodies are turned, so that their side seams are moved along the grooved lower edge of the horn extension onto the stationary guide device by the converging flange of which the seam is placed in line with the longitudinal axis of the acid and soldering tanks. The can-body is next taken hold of at its rear end by one of the pushers of the carrier-chain, and then moved on the horizontal guide-rails to the acid-tank, where it is supplied with the required quantity of acid at the upper and lower wicks of the same, being then conducted to the soldering-trough in which the side seam of the can-body is submerged into the liquid solder, so that the same closes the inside and outside of the seam in a very reliable manner. From the soldering-trough the can-body passes through between the interior and exterior wipers, by which the surplus solder is removed from the same, and thence past the cleaning and drying brushes and over the ends of the guide-rails to the heading-machine. (Not shown.) The motions of the oscillating conveyer-arms, the carrier-chain, the solder-supplying dipper, and the drying-brush are so timed that they act on the side seams of the can-bodies at the proper time, as they pass in longitudinal direction through the machine, so that the side seam of every can-body is soldered in a perfect and reliable manner and all traces of acid removed from the interior of the can-body.

Having thus described my invention, I claim as new and desire to secure by Letters Patent—

1. In a can-body-soldering machine, the combination, with a vertical can-body former-horn, of a curved horn extension, the upper part of which is located vertically below the horn, for dropping the can-bodies by gravity from the former-horn onto the upper part of the horn extension, substantially as set forth.

2. In a can-body-soldering machine, the combination, with a vertical can-body former-horn, of a curved horn extension located vertically below the horn, said extension being reduced in width in one direction, so as to facilitate the passage of the can-bodies over the same, substantially as set forth.

3. In a can-body-soldering machine, the combination of a vertical can-body former-horn, a curved horn extension, means for attaching the horn extension to the lower end of the horn, said extension being provided with a central groove along its lower edge for guiding the side seam of the can-body, substantially as set forth.

4. In a can-body-soldering machine, the combination of a vertical can-body former-horn, a curved horn extension located below the same, an inclined rhombic recess at the upper part of the horn extension, and a curved groove communicating with the lower end of said recess and extending along the lower edge of the horn extension for turning the can-body and guiding it over the extension, substantially as set forth.

5. In a can-body-soldering machine, the combination, with a vertical can-body former-horn, of a curved horn extension below the horn and means for moving the can-body dropped from the horn on the horn extension over the lower end of the latter, substantially as set forth.

6. In a can-body-soldering machine, the combination, with a vertical can-body former-horn, a horn extension located below the same and provided with arc-shaped grooves at opposite sides of the same, of oscillating conveyer-arms provided with push-pins, for engaging the can-body that is dropped by gravity from the horn onto the horn extension, and moving it over the lower end of the extension, substantially as set forth.

7. In a can-body-soldering machine, the combination of a vertical can-body former-horn, a curved horn extension connected to the lower end of said horn and provided with arc-shaped grooves at opposite sides of said horn extension, oscillating conveyer-arms provided with spring-actuated push-pins for engaging the can-body dropped by gravity from the horn onto the horn extension, and means for intermittently oscillating the arms so as to move the can-body in downward direction over the horn and permit the return of the push-pins over the next following can-body, substantially as set forth.

8. In a can-body-soldering machine, the combination with a vertical can-body former-horn, a curved horn extension attached to the bottom of said horn, said extension being provided at opposite sides with arc-shaped grooves and notches at its inner edge, of oscillating conveyer-arms, provided with spring-actuated push-pins at their outer ends for moving the can-body over the horn extension and permitting the return of the arms over the next can-body while the same is retained by one of the notches of the horn extension, substantially as set forth.

9. In a can-body-soldering machine, a hollow horn extension closed at the ends and adapted for use as an acid-receptacle, substantially as set forth.

10. In a can-body-soldering machine, the combination of a can-body former-horn, a hollow horn extension attached to the bottom of the horn, an acid-supply tube passing through the horn and connected with the upper end of the horn extension, and an acid-tube connected with the lower end of the horn extension, said acid-tube being provided with discharge-orifices near its outer closed end, substantially as set forth.

11. In a can-body-soldering machine, the combination of a can-body former-horn, a hollow horn extension adapted to be used as an acid-receptacle, a horizontal acid-tube communicating with the lower end of the horn extension, a water-tube attached to the closed end of the acid-tube and forming an extension of the acid-tube, and a water-supply pipe passing through the horn, horn extension and acid-tube and communicating with said water-tube, substantially as set forth.

12. In a can-body-soldering machine, the combination of a can-body former-horn, a hollow horn extension located vertically below said horn, said extension being adapted to be used as an acid-receptacle, an acid-supply tube connected with the upper end of the horn extension, a horizontal acid-tube connected with the lower end of the horn extension, and a water-tube forming an extension of the acid-tube, substantially as set forth.

13. In a can-body-soldering machine, the combination with a can-body former-horn, a hollow horn extension located vertically below said horn, an acid-supply tube connected with the upper end of the horn extension, a horizontal acid-tube attached to the lower end of said extension, a water-tube attached to the end of the acid-tube and forming an extension of the same, a water-supply pipe passing through horn, horn extension and acid-tube and connecting with the water-tube, and parallel inclined wire rods extending from the lower end of the horn extension to the outer end of the water-tube, for supporting the latter in position, substantially as set forth.

14. In a can-body-forming machine, the combination of a hollow horn extension, adapted for use as an acid-receptacle, a water-tube connected with the end of the horn extension, a water-supply pipe passing through the horn extension to the water-tube, and parallel inclined wire rods extending from the end of the horn extension to the outer end of the water-tube, for supporting the latter in position, substantially as set forth.

15. In a can-body-soldering machine, the combination, with a vertical can-body former-horn, a curved horn extension located below the same for receiving the can-bodies by gravity from the horn, a mechanism for moving the can-bodies over the lower end of the horn extension, means for guiding the can-bodies in horizontal direction, and a carrier-chain for moving the can-bodies in longitudinal direction through the machine, substantially as set forth.

16. In a can-body-forming machine, the combination of a hollow horn extension adapted to be used as an acid-receptacle, an acid-tube connected with the lower end of the horn extension and provided with apertures at the lower part and means for supplying the acid to the inner and outer side surfaces of the side seam of the can-body, substantially as set forth.

17. In a can-body-soldering machine, the combination of a vertical can-body former-horn, a hollow horn extension located vertically below the said horn, and adapted to serve as an acid-receptacle, a horizontal acid-tube connecting with the lower end of the horn extension, said acid-tube being closed at the outer end and provided with apertures in its lower part, and wicks for supplying the acid to the inner and outer surfaces of the side seam of the can-body, substantially as set forth.

18. In a can-body-soldering machine, the combination of a vertical can-body former-horn, a curved hollow horn extension located below the same and adapted to serve as an acid-receptacle, an acid-tube attached to the lower end of the horn extension, said acid-tube being provided with discharge-apertures in its lower part, a stationary wick for supplying the acid to the inner surface of the side seam, an acid-collecting tank below said wick, and a spring-actuated wick in said tank for supplying the acid to the outer surface of the side seam, substantially as set forth.

19. In a can-body-soldering machine, the combination of a curved horn extension, provided with means for guiding the can-bodies, means for conveying the can-bodies over the horn extension, a can-body guide device located near the lower end of the horn extension and provided with conveying-flanges at its lower part for directing the seams of the can-bodies into line with the acid-supplying and soldering devices, substantially as set forth.

20. In a can-body-soldering machine, the combination of a hollow horn extension adapted as an acid-receptacle, an acid-supplying tube having apertures, upper and lower wicks for supplying the acid to the inner and outer surfaces of the side seams, grooved jaws for holding the wicks in position and a tank below the wicks for collecting the surplus acid, substantially as set forth.

21. In a can-body-soldering machine, the combination of a hollow horn extension, acting as an acid-receptacle, an acid-supplying tube closed at one end and provided with apertures at its lower part, an upper acid-supplying wick located below the apertures in the acid-tube, an acid-tank below said wick, a lower wick supported between jaws in said tank, pivot-links attached to said jaws a spring applied to said links, and a stop for one of said jaws located in the end wall of the tank, so that the can-body can pass through between the acid-supply wicks by the yielding of the lower wick, and be supplied with acid on the inner and outer surfaces of the side seam, substantially as set forth.

22. In a can-body-soldering machine, the combination of a hollow horn extension adapted to be used as an acid-receptacle, an acid-tube connected with the lower end of said extension, wicks for supplying acid to the inner and outer surfaces of the side seam of the can-body, a solder-tank, a soldering-trough at the upper end of the solder-tank and connected therewith, and means for carrying the side seams of the can-bodies through the soldering-trough, substantially as set forth.

23. In a can-body-soldering machine, a solder-tank, provided with a longitudinal soldering-trough having tapering sides and a longitudinal opening, and outwardly projecting tapering and converging lips in line with the trough at each end of the tank, substantially as set forth.

24. In a can-body-soldering machine, a solder-tank provided with a corrugated bottom and interior transverse braces for connecting the upper ends of the corrugations, substantially as set forth.

25. In a can-body-soldering machine, a solder-tank, composed of a semicircular top, a corrugated bottom forming a large heating-surface, transverse brace-pieces for connecting said corrugations and end walls attached to the top and bottom, substantially as set forth.

26. In a can-body-soldering machine, a solder-tank formed of a semicircular top provided with a longitudinal soldering-trough connected with the tank by a central longitudinal slot, a corrugated bottom, transverse braces for stiffening the corrugations, and end walls provided with beveled lips in line with the soldering-trough, substantially as set forth.

27. In a can-body-soldering machine, the combination of a solder-tank having a longitudinally-slotted soldering-trough, guide-rails at both sides of the trough, means for carrying the can-bodies through said trough, stationary retaining-flanges located at opposite sides of the trough between the same and the guide-rails, and transverse clamping-bolts for said flanges, the flanges serving for keeping the side seams of the can-bodies immersed in the solder during their motion through the trough, substantially as set forth.

28. In a can-body-soldering machine, the combination of a solder-tank having a longitudinally-slotted soldering-trough, a receptacle for receiving solid solder extending into said tank, a cylinder open at the lower end and extending through the receptacle, and means for supplying melted solder from said receptacle to said cylinder and from the same to the tank, so as to keep up a regular level of solder in the soldering-trough, substantially as set forth.

29. In a can-body-soldering machine, the combination with a solder-tank having a longitudinally-slotted soldering-trough, a receptacle for receiving the solid solder, said receptacle extending into the tank, means for supplying melted solder from said receptacle to the tank and trough and an alarm device for indicating the falling of the level of solder in the soldering-trough, substantially as set forth.

30. In a can-body-soldering machine, the combination, with a solder-tank of a receptacle located at one side of the same, for receiving the solid solder, a vertical cylinder in said receptacle open at the lower end and communicating with the receptacle, a vertically-reciprocating dipper in said cylinder, a second cylinder extending through the bottom of the receptacle into the solder-tank, and an inclined gutter connecting the upper end of the dipper-cylinder with the solder-transmitting cylinder, substantially as set forth.

31. In a can-body-soldering machine, the combination, with a solder-tank having a longitudinally-slotted soldering-trough, of a receptacle arranged at one side of said tank and extending into the same for receiving the solid solder, a cylinder extending through the bottom of the receptacle into the solder-tank and an intermittently-operated dipper device for supplying the liquid solder from the receptacle to said cylinder and from the same to the solder-tank for keeping up a uniform level of solder in the soldering-trough, substantially as set forth.

32. In a can-body-soldering machine, the combination of a solder-tank having a longitudinally-slotted soldering-trough, a receptacle arranged at one side of the tank for receiving the solid solder, a dipper-cylinder extending into the receptacle and being open at its lower end, a second cylinder extending through the bottom of the receptacle into the solder-tank, a vertically-reciprocating dipper having a pocket guided in a groove in the dipper-cylinder, an inclined gutter connecting the upper end of the dipper-cylinder with the transmitting-cylinder, for keeping up the supply of solder to the solder-tank and trough, substantially as set forth.

33. In a can-body-soldering machine, the combination of a solder-tank having a longitudinally-slotted soldering-trough, a solder-supplying receptacle at one side of said tank, a dipper-cylinder open at its lower end and extending into said receptacle, a vertically-reciprocating dipper guided in said cylinder, a second cylinder passing through the bottom of the receptacle into the solder-tank and being open at its lower end, an inclined gutter connecting the upper end of the dipper-cylinder with the transmitting-cylinder, said cylinder having an opening in its top adjacent thereto, so as to return the surplus solder supplied by the dipper into the receptacle, substantially as set forth.

34. In a can-body-soldering machine, the combination, of a solder-tank having a longitudinally-slotted soldering-trough, a receptacle for the solid solder arranged along one side of the tank and extending into the same, a dipper device for intermittently supplying the melted solder from the receptacle to the tank, an automatic alarm device for indicating the falling of the level of solder in the receptacle and trough, and means for intermittently actuating the alarm device, substantially as set forth.

35. In a can-body-soldering machine, the combination of a solder-tank having a longitudinally-slotted soldering-trough, a receptacle for the solid solder extending into said tank, a dipper-cylinder located in said receptacle and being open at its lower end, a second cylinder extending through the bottom of the receptacle into the solder-tank, a vertically-reciprocating dipper in the dipper-cylinder, an inclined gutter connecting the upper end of the dipper-cylinder with the solder-transmitting cylinder, an automatically-operated alarm device, and means interposed between the dipper-rod and the bell of the alarm device, whereby the bell is sounded at intervals by the reciprocating motions of the dipper-rod, until the receptacle is resupplied with solid solder, substantially as set forth.

36. In a can-body-soldering machine, the combination, with the can-body carrier-chain and the guide-rails for the can-bodies, of an interior pivoted and spring-actuated wiper, a stationary can-body-holding abutment located above the interior wiper and above the can-bodies, and an exterior pivoted and spring-actuated wiper, said interior and exterior wipers serving to remove the surplus solder from the side seams of the can-bodies, substantially as set forth.

37. In a can-body-soldering machine, the combination with the can-body carrier-chain and the guide-rails for the can-bodies, of a longitudinal water-tube, a stationary water-supplying wiper for cleaning the inner surface of the side seam, and a rotary drying-brush for drying the same, substantially as set forth.

38. In a can-body-soldering machine, the combination with the can-body carrier-chain and the guide-rails for the can-bodies, of a valved water-tube having outlet-apertures, a stationary water-supplying wiper on said tube below the apertures, and a rotary drying-brush arranged eccentrically on the water-tube, substantially as set forth.

39. In a can-body-soldering machine, the combination with the can-body carrier-chain and the guide-rails for the can-bodies, of a longitudinal water-tube, a valve in the same, a stationary water-supplying wiper located vertically below the apertures in the water-tube, a drying-brush arranged eccentrically on the water-tube, means for compressing the layers of the drying-brush, and mechanism for imparting rotary motion to said drying-brush, substantially as set forth.

40. In a can-body-soldering machine, the combination with the can-body carrier-chain and the guide-rails for the can-bodies, of a water-supply tube, a wiper for supplying water to the inside of the side seams for cleaning and cooling said seam, a valve in said water-tube for regulating the supply of water to the wiper, a water-tank below the wiper, a rotary drying-brush located eccentrically on the water-tube, and means for imparting rotary motion to said drying-brush, substantially as set forth.

41. In a can-body-soldering machine, the combination with the can-body carrier-chain and the guide-rails for the can-bodies, of a valved longitudinal water-tube, having apertures, a stationary wiper below said apertures, an eccentric cylinder on the water-tube, a drying-brush located on said cylinder, and mechanism for transmitting rotary motion to said drying-brush, substantially as set forth.

42. In a can-body-soldering machine, the combination of an upper and a lower horizontal guide-tube, the lower tube being provided with a longitudinal slit, an endless can-body carrier-chain composed of pivot-links and of pushers, the shanks of which pass through the slit of the lower guide-tube, sprocket-wheels for said carrier-chain, and means for imparting rotary motion to one of the sprocket-wheels of the carrier-chain, substantially as set forth.

43. In a can-body-soldering machine, the combination of supporting-pillars, stays on said pillars, horizontal guide-tubes attached to said stays, the lower guide-tube being provided with a longitudinal slit in its bottom part, an endless can-body carrier-chain formed of pivot-links and having pushers on some of the links, a driving sprocket-wheel, a guide sprocket-wheel, brackets having bearings for said sprocket-wheels, means for imparting rotary motion to one of the sprocket-wheels, and means for adjusting one of the drums for setting the carrier-chain to the suitable degree of tension, substantially as set forth.

44. In a can-body-soldering machine, the combination of the supporting-pillars, stays supported on said pillars, one of said stays having a slot, transverse clamping-rods passing through the stays and pillar, an upper and a lower horizontal guide-tube supported on said stays, the lower guide-tube having a longitudinal bottom slit, a can-body carrier-chain composed of pivot-links and pushers on some of the links, sprocket-wheels for said carrier-chain, brackets for supporting said sprocket-wheels, and means for imparting rotary motion to one of said sprocket-wheels, the slot in one of said stays permitting the expansion and contraction of the carrier-chain under changes of temperature, substantially as set forth.

In testimony that I claim the foregoing as my invention I have signed my name in presence of two subscribing witnesses.

RICHARD STEEGMÜLLER.

Witnesses:
PAUL GOEPEL,
K. R. BRENNAN.